(No Model.) 4 Sheets—Sheet 1.

D. H. ALLEN & W. H. GAMBLE.
FOLDING BOAT.

No. 403,171. Patented May 14, 1889.

Attest:
Geo. T. Smallwood
Lewis T. Treek

Inventor:
David H. Allen
Wm. H. Gamble
By A. H. Smith & Son
Attys.

(No Model.) 4 Sheets—Sheet 2.
D. H. ALLEN & W. H. GAMBLE.
FOLDING BOAT.
No. 403,171. Patented May 14, 1889.
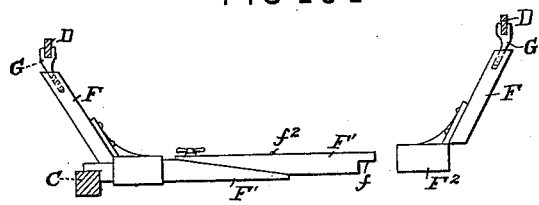
FIG. 3.
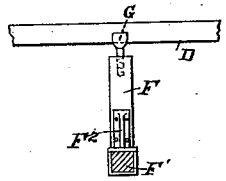
FIG. 3b.
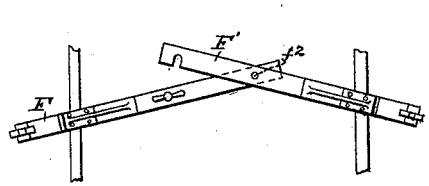
FIG. 3a.
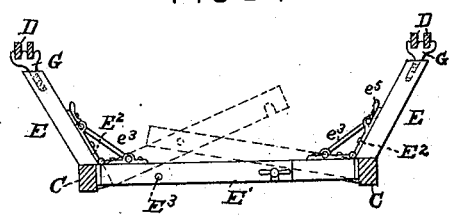
FIG. 4.
FIG. 4a. FIG. 4b. FIG. 4c.
FIG. 5. FIG. 5a.
Attest:
Geo. T. Smallwood
Lewis T. Trick
Inventor:
David H. Allen
Wm. H. Gamble
By A. M. Smith & Son
Attys.

(No Model.) 4 Sheets—Sheet 3.
D. H. ALLEN & W. H. GAMBLE.
FOLDING BOAT.
No. 403,171. Patented May 14, 1889.
FIG. 6.
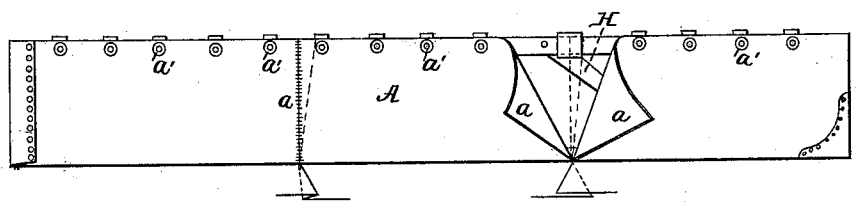
FIG. 6a.     FIG. 7.
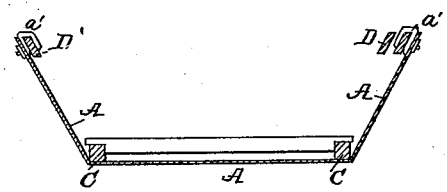 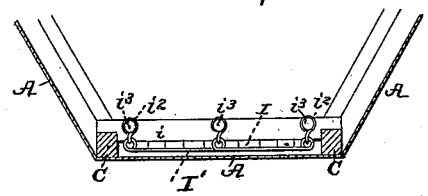
FIG. 7a.
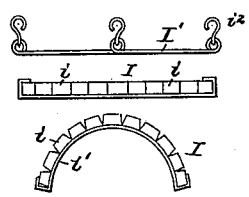
FIG. 8.
Attest:
Geo. T. Smallwood
Lewis J. Trick
Inventor:
David H. Allen
Wm. H. Gamble
By A. M. Smith
attys (No Model.) 4 Sheets—Sheet 4.
D. H. ALLEN & W. H. GAMBLE.
FOLDING BOAT.
No. 403,171. Patented May 14, 1889.
FIG.-9.-
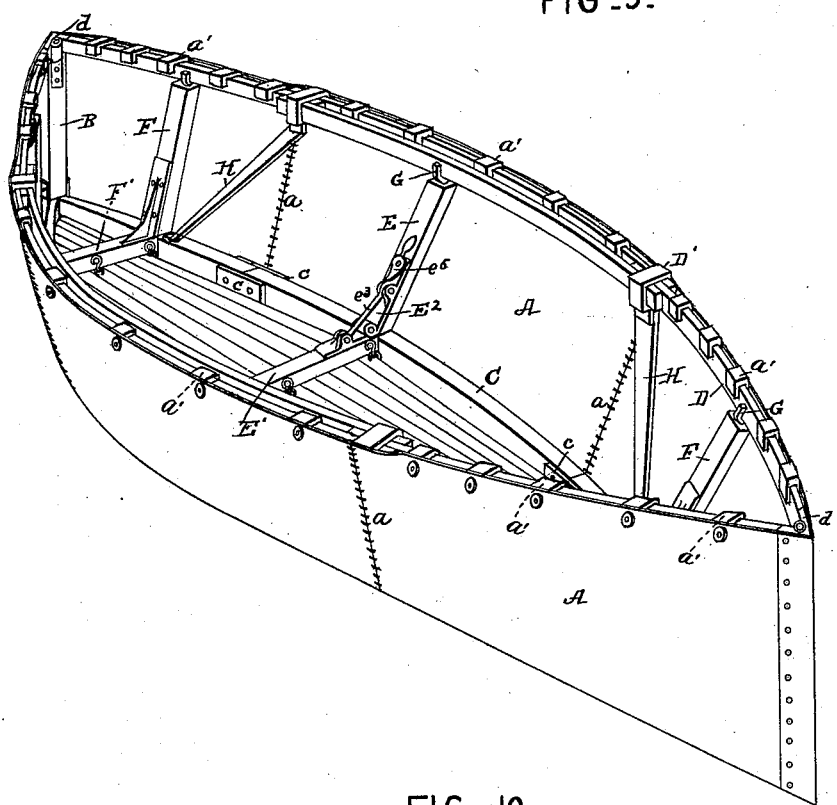
FIG.-10
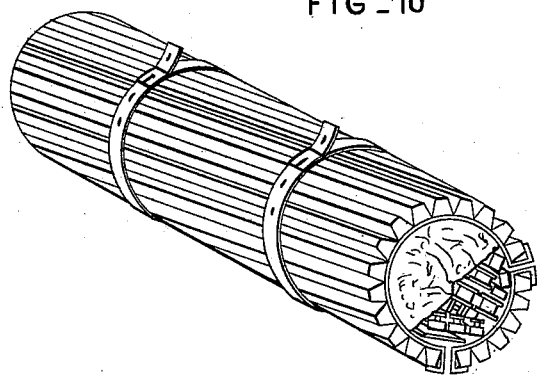
Attest:
Geo. T. Smallwood.
Jas. K. McCathran.
Inventors;
David H. Allen,
Wm. H. Gamble,
By A. M. Smith & Son, attys.

UNITED STATES PATENT OFFICE.

DAVID H. ALLEN AND WILLIAM H. GAMBLE, OF MIAMISBURG, OHIO.

FOLDING BOAT.

SPECIFICATION forming part of Letters Patent No. 403,171, dated May 14, 1889.

Application filed September 17, 1888. Serial No. 285,615. (No model.)

*To all whom it may concern:*

Be it known that we, DAVID H. ALLEN and WILLIAM H. GAMBLE, both of Miamisburg, county of Montgomery, and State of Ohio, have invented a new and useful Improvement in Folding Boats, of which the following is a full, clear, and exact description, reference being had to the accompanying drawings, making part of this specification.

Our invention relates to an improvement in that style of boats classified as "sectional" and "folding," and has for its object to produce a boat which can be taken apart, folded for transportation, and easily and quickly put together when desired; and to the above purpose it consists in certain novel features of construction and arrangement hereinafter specifically set out.

Figure 1:
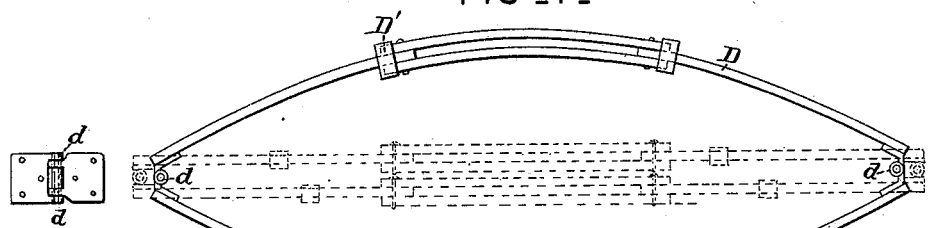
Figure 1B:
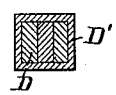
Figure 1A:
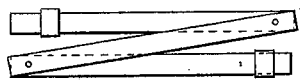
Figure 2:
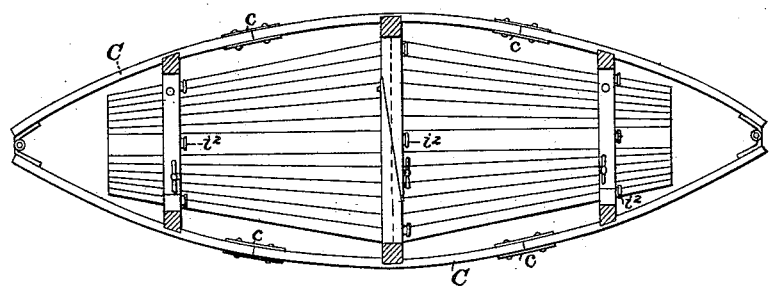
Figure 2A:
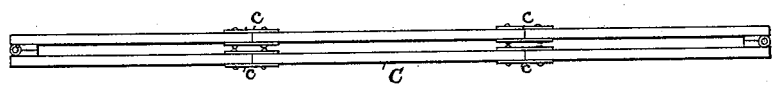
Figure 2B:
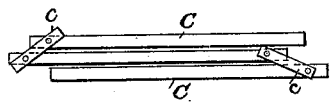

In the accompanying drawings, Figure 1 represents in plan a view of the upper or gunwale frame of the boat, (shown expanded in full lines and closed in dotted lines,) also a detached view of the connecting-hinges; Fig. 1$^a$, a side view of the same folded for transportation; Fig. 1$^b$, a cross-section of one side of the gunwale-frame, taken through the ferrule; Fig. 2, a plan view of the lower or bottom frame in expanded position, showing also the ribs (in section) and the cross-braces or expanding-bars and flooring in position; Fig. 2$^a$, a similar view of the bottom frame closed, and Fig. 2$^b$ side view of same folded for transportation. Fig. 3 represents an end elevation of the end ribs and sockets and the cross-brace or expansion bar; Fig. 3$^a$, a plan view of same; and Fig. 3$^b$, a cross-section through one of the end cross-brace or expansion bars, showing a rib and portion of the gunwale in elevation. Fig. 4 is a view of the central ribs, cross-brace, and knee-braces. Figs. 4$^a$, 4$^b$, and 4$^c$ are enlarged detail views showing the manner of connecting and bracing the ribs and expansion-bars. Fig. 5 indicates a side elevation of the boat-frame set up. Fig. 5$^a$ is a view of the head-block in elevation and plan. Fig. 6 represents the covering for the boat-frame and the manner of cutting and fitting same. Fig. 6$^a$ shows in cross-section the manner of attaching the covering of canvas or other material to the frame. Fig. 7 shows the floor and the manner of supporting the same, and Fig. 7$^a$ the same parts in detail. Fig. 8 represents the manner of making the boat up into a bundle. Fig. 9 is a perspective view of my improved folding boat set up ready for use; and Fig. 10 illustrates in perspective the manner in which the boat is made up into a bundle and the flooring wrapped around the same and strapped, so as to form a carrying-case therefor.

In describing our improvements we will at the same time follow as far as practicable the order in which the different parts are set up or put together.

Referring to Fig. 6, A represents the covering for the boat-frame, which covering is preferably made of canvas rendered waterproof in any usual manner, or any well-known material that may be adapted to the purpose. It is preferred to make such covering in one piece, and in order to give the proper form or shape thereto the same is folded, lapped, or cut and sewed at suitable points, $a\ a$, as shown. The ends of the sack thus formed are lapped one upon the other and secured by tacking or in any desired manner to blocks or uprights B (see Fig. 5) of suitable height, according to the depth of the boat and canvas cover. Said cover is also provided with hooks $a'$, disposed at short intervals along its upper edge, the office of which will appear hereinafter. The canvas sack thus constructed is set upon the ground or floor with the blocks or posts B upright. The lower or bottom frame, which will now be described, is then placed in position. Said bottom frame (see Figs. 2 and 2$^a$) is composed of six pieces, C, of lumber of the requisite elasticity to allow of the necessary expansion, and these pieces are connected or united (those on either side) by metal straps $c$, preferably placed on both sides of the adjacent ends of the pieces C and riveted thereto by any suitable rivet or bolt and nut. The end pieces are united or pivoted by hinges $c'$, or in any usual manner. We thus have a frame which may be compactly folded into the form shown in Fig. 2$^b$. The blocks or posts B of the canvas sack are socketed at their lower ends, or are cut out or recessed, as shown at $b$, and said socket is protected by metal plate $b'$, surrounding the same and secured to the block. The bottom frame, C, is introduced into the canvas sack A, as shown in dotted lines in Fig. 5, the hinged ends thereof entering the socket $b$ in the blocks B, when by bearing down upon the frame the sack A expands the bottom frame into nearly its desired position. The gunwale-frame D, Figs. 1, 1$^a$, and 1$^b$, is next inserted. This frame is composed, by preference, of eight pieces of timber—four on either side. The outer end pieces are hinged together at their outer ends by suitable hinges, $d$, and the inner ends on either side lie between and are pivoted to the opposite ends of two similar pieces, as shown. By this construction the frame D can be folded into the compact form shown in Fig. 1$^a$. When the frame D' is unfolded and laid out, as shown in Fig. 1, it is prevented from again folding by means of ferrules or thimbles D', which surround the end pieces of the frame and are adapted to be slipped over the ends of the middle pieces, thus preventing the joint from breaking. The hinge $d$, which unites the end pieces of the frame D, has a tubular hinge-pin, $d'$, which, when said frame is introduced into the canvas sack A, fits over and upon a vertically-projecting pin, $b^2$, thus uniting said frame with the blocks. The pin $b^2$ is screw-threaded and provided with a nut, $b^3$, which underlies the gunwale-frame D, and when turned operates to elevate or lower said frame, and thus stretch or slack the cover A. The bottom and gunwale frame being now placed in position, the canvas cover is secured to the latter by means of hooks $a$, above referred to, which extend upward over the same. This accomplished, the frames C and D are spread or extended laterally by the central ribs and cross-brace indicated in Fig. 4.

E E represent the central ribs, which are inclined outward in the usual manner to give proper form to the boat when complete. These ribs are connected to a divided and jointed cross-brace, E', by means of suitable pivoted knees, E$^2$. (Shown enlarged in Figs. 4$^b$ and 4$^c$.) These knees or hinges E$^2$ are constructed and operated as follows: Each knee is formed of two castings or plates, $e$ and $e'$, united by a pivot, the part $e$ being attached to the bar or brace E' and the part $e'$ to the inclined rib E.

$e^2$ indicates a lip on the lower end of a downwardly-extending arm of part $e'$ of the knees, which underlies the brace E' and takes the strain from the pivot-pin of said knee. Said downwardly-extending arm also serves to bear against and force outward the bottom frame, C, when the jointed brace-bar E' is operated. This brace E' is composed of two pieces, which overlap each other and are connected by a pivot, E$^3$, thus forming what may be termed a "knuckle-joint," by means of which considerable power is obtained for expanding the frames laterally. When the frame is so expanded and the jointed brace forced from the position indicated in dotted lines in Fig. 4 to that shown in full lines in the same figure, said brace is held in such position by means of a thumb-screw or equivalent device.

$e^3$ represents an I-shaped brace, which is pivoted to the part $e$ and adapted to be received at its other end by lugs or ears $e^4$, projecting from the part $e'$ of the knee. When in this position it is locked or held by means of a pivoted button or cam, $e^5$. This button or cam may be of any desired form, but is shown in the form of a cam which will operate, when rocked on its pivot, to force down brace $e^3$ with considerable pressure, thus securing a very stiff joint between the ribs E and cross-brace E'. This button or cam may also have a projecting lip, $e^6$, which will overlie the end of the brace $e^3$ and prevent possible displacement of the same. The end ribs and cross-braces indicated at F and F', Figs. 3, 3$^a$, and 3$^b$, are somewhat similar in construction, but differ in three respects, viz: The ribs are provided with knees F$^2$, secured thereto and having socketed or tubular bases, as shown, through which the ends of the cross-brace F' pass and abut against the inner face of the bottom frame, the ends of the brace F' being notched at $f$ for that purpose. Said brace F' is jointed in a manner similar to that E', but by preference has a vertical pivot, $f^2$, so that its action is in a horizontal instead of a vertical plane. The ribs E and F are provided with yokes or pronged supports G, which embrace and uphold the gunwale-frame D. These yokes are screwed into the upper ends of the ribs, and may be adjusted up or down, for elevating or lowering the gunwale for regulating the tension of the canvas, by simply screwing them up or down.

H and H' represent inclined brace-bars, which are pivoted to the gunwale-frame at their upper ends and rest against feet $h$ on the bottom frame, or are otherwise secured thereto, thus giving additional rigidity to the frame. They are adapted to be folded into the position indicated in dotted lines in Fig. 5 for packing and transportation.

I indicates the flooring, which is composed of a number of tapering pieces or slats, $i$, secured together by being united or fastened to a piece of canvas, $i'$, as indicated, said flooring being upheld or supported by means of a bent wire or rod, I', which underlies the same. Said wire or rod is formed with three or more loops or eyes, the central loop or loops extending up through perforations in the flooring and the end loops on the sides thereof. Suitable hooks, $i^2$, are fastened into said loops or eyes and engage and hook over suitable pins, $i^3$, on the cross-braces E' and F', above described. The flooring I is made in two similar sections, which meet under the central cross-brace, E', as indicated in dotted lines in Fig. 2, being placed in position before the end ribs and braces are introduced. By means of this flooring the canvas will be prevented from bagging under the boat and retarding the progress of same. By means of this construction, also, the flooring may be rolled up, as indicated in Fig. 7ª, and put around the outside of the bundle made by the canvas sack, gunwale, and bottom frames, ribs, braces, &c., thus making a neat and compact bundle, as shown in Fig. 8.

It will thus be seen by the construction described that our boat may be easily and quickly taken apart, folded, and placed in a carrying-case about one-third the length of the boat for transportation, and that the same may be readily put together and set up when desired.

Having now described our invention, we claim as new—

1. The combination, with the frame of a folding boat, of a separable and expansible gunwale made in three sections and composed of overlapping strips hinged together and provided with sleeves or ferrules adapted to slip over the pivotal joint thereof, substantially as described.

2. In a folding boat, the combination, with the ribs and gunwale thereof, of the interposed screw yokes or forks located on the upper ends of said ribs for adjusting the height of the gunwale, substantially as described.

3. In a folding boat, the combination, with the gunwale and bottom frames, of the cross-brace E', the ribs E, hinged thereto, the adjustable brace $e^3$, and means, substantially as described, for fastening said brace.

4. The combination, with the gunwale and bottom frame of a folding boat, of the cross-brace E' and the ribs E, united by a knee pivoted at the junction of said cross-brace and ribs and provided with a foot or downward extension and lip, $e^2$, on said extension for engaging said bottom frame, and an adjustable brace, $e^3$, attached to said knee, and means for fastening the same, substantially as described.

5. In a folding boat, and in combination with the gunwale and bottom frame, the ribs F, provided with the socketed knees $F^2$, and a jointed expanding cross-bar, F', engaging said socketed knees and having its ends notched or shouldered for engaging said bottom frame, for the purpose and substantially as described.

6. The combination, with the frame of a folding boat, of a jointed cross bar or brace made in two overlapping pieces pivoted together and at its opposite ends engaging the bottom frame for expanding the same, substantially as set forth.

7. The combination, with the frame of a folding boat, of the pivoted brace-arms H, interposed between the gunwale and bottom frame, both of which extend the entire length of the boat, and retaining-feet $h$, substantially as and for the purpose described.

8. A folding and expansible frame provided at its ends with tubular hinge-pins, in combination with a canvas sack having blocks B at its ends, provided with hinge-pins and recesses adapted to receive the ends of said folding and expansible frame, as set forth.

9. A folding and expansible frame provided with the tubular hinge-pin, in combination with a canvas sack having blocks B at its ends, provided with screw-threaded pins $b^2$ and nuts $b^3$ thereon, substantially as and for the purpose described.

10. A separable covering for folding and sectional boats, consisting of a canvas sack made in one piece, folded and seamed as described, and secured to blocks B at its ends, and provided with hooks $a'$, for engaging the gunwale-frame, all substantially as specified.

11. The combination, with the frame of a folding boat, provided with pins $i^2$, of a flooring made in two sections, each composed of tapering slats united by a flexible strip or sheet, and hooks or eyes secured to said flooring for suspending it from the cross-braces E' and F', substantially as and for the purpose described.

12. The combination, with the frame of a folding boat, of a flooring composed of slats united by a flexible strip or sheet, and hooks and pins secured to said flooring and to the cross-braces E' and F' of the frame for supporting said flooring, substantially as specified.

13. The combination, with the frame of a folding boat, of a separable and expansible bottom frame composed of a number of strips or pieces, C, of wood or suitable material, an equal number on either side of the frame, said strips or pieces being pivotally united by means of parallel side straps, $c$, adapting the frame as a whole to be folded one section upon another, and the end pieces provided with hinges at either end of the frame, whereby said bottom frame may be expanded or folded compactly, as shown and described.

14. A covering for folding boats, made of a single piece of canvas folded and seamed, as described, and provided with hooks secured thereto, in combination with a folding and expansible frame having an adjustable gunwale and screw-yokes, substantially as described, for adjusting the height of said gunwale, for the purpose specified.

In testimony whereof we have hereunto set our hands this 13th day of September, A. D. 1888.

DAVID H. ALLEN.
WILLIAM H. GAMBLE.

Witnesses:
AMOS K. CLAY,
ELWOOD ALLEN.